United States Patent [19]
Burgdorf et al.

[11] Patent Number: 5,664,849
[45] Date of Patent: Sep. 9, 1997

[54] HYDRAULIC BRAKE SYSTEM WITH SLIP CONTROL

[75] Inventors: Jochen Burgdorf, Offenbach; Dieter Dinkel, Eppstein/Ts; Peter Volz, Darmstadt, all of Germany

[73] Assignee: ITT Automotive Europe GmbH, Germany

[21] Appl. No.: 619,713

[22] PCT Filed: Sep. 23, 1994

[86] PCT No.: PCT/EP94/03180

§ 371 Date: Jun. 20, 1996

§ 102(e) Date: Jun. 20, 1996

[87] PCT Pub. No.: WO95/09099

PCT Pub. Date: Apr. 6, 1995

[30] Foreign Application Priority Data

Sep. 28, 1993 [DE] Germany ............... 43 32 819.9

[51] Int. Cl.[6] .................................................. B60T 8/40
[52] U.S. Cl. ............................. 303/116.1; 303/900
[58] Field of Search ...................... 303/116.1, 115.4, 303/113.5, 10, 900, 119.1

[56] References Cited

U.S. PATENT DOCUMENTS 3,819,236  6/1974  Fink et al. ............... 303/116.1

FOREIGN PATENT DOCUMENTS

| | | |
|---|---|---|
| 0371305 | 5/1989 | European Pat. Off. . |
| 2680742 | 3/1993 | France . |
| 3641922 | 6/1987 | Germany . |
| 4015745 | 4/1991 | Germany . |
| 4002635 | 8/1991 | Germany . |
| 4010842 | 10/1991 | Germany . |
| 4023708 | 1/1992 | Germany . |
| 4108756 | 9/1992 | Germany . |
| 4132471 | 4/1993 | Germany . |
| 4202389 | 8/1993 | Germany . |
| WO9118774 | 12/1991 | WIPO . |
| WO9201592 | 2/1992 | WIPO . |

*Primary Examiner*—Lee W. Young
*Attorney, Agent, or Firm*—J. Gordon Lewis; Thomas N. Twomey

[57] ABSTRACT

The present invention relates to a brake system with slip control, including digitally operated electromagnetic inlet and outlet valves, wherein the inlet valve is provided with a restrictor valve control responsive to differential pressures. To prevent a premature operation of the controllable restrictor, invariable orifices are arranged in the main pressure line upstream of the inlet valve and downstream of the controllable restrictor.

5 Claims, 2 Drawing Sheets

HYDRAULIC BRAKE SYSTEM WITH SLIP CONTROL

TECHNICAL FIELD

The present invention relates to vehicle brake systems and more particularly relates to hydraulic brake system with slip control.

BACKGROUND OF THE INVENTION

Discontinuous fluid pressure associated with digitally controlled causes undesirable noise emission due to the pulse-like pressure variation and due to the noise emanating from the inlet and outlet valves associated with the digital control of the fluid.

As disclosed in patent application Ser. No. DE 43 19 227.0, digitally controlled brake systems are generally known. However, it has been found in the brake system described in application number 43 19 227.0 that, on quick operation of the brake (emergency braking), an undesirable premature activation of the restrictor, connected downstream of the inlet valve, cannot be prevented with sufficient reliablity. Such a premature restrictor activation causes change of the pedal feeling and the vehicle-related gradient of pressure increase. More particularly, the reduction of the pressure-increase gradient caused by the restrictor effect reduces the braking efficiency in slip-free, dynamically stable driving operations.

European patent application 0 317 305 discloses a solenoid valve which is suitable for use in anti-lock hydraulic brake systems. The solenoid valve has a magnetic core accommodating a coil. The magnetic core is confined by a magnetic armature on one side and by a restrictor member on the other side. The restrictor member has a passage which is closable by a valve needle. The restrictor member is compressed in an axially movable fashion between the magnetic core and a housing cover in which the pressure fluid inlet is provided, so that in the operating condition, where the valve needle closes off the supply duct in the restrictor member, a differential pressure acts on either side of the restrictor member and causes displacement of the valve needle in relation to the magnetic armature. This preloads a compression spring interposed between the valve needle and the magnetic armature. The preloading force of the compression spring produced by the difference in pressure on the restrictor member causes a quick release of the magnetic armature from the magnetic core when the electromagnetic excitation is interrupted. This results in short valve opening times. A spring resetting force acting on the valve needle in the opening sense favors the quick opening of the supply duct in the restrictor member. Thus, pressure fluid propagates to an annular slot after having passed through the free passage at the valve needle. The annular slot is provided between the hollow-cylindrical inside wall of the magnetic core and the outside wall of a cylindrical part in which the valve needle extends. The fluid which emanates from the valve inlet is conducted through the supply duct in the restrictor member and the subsequent annular slot into a pressure fluid connection which leads to the pressure fluid consumer.

Therefore, an object of the present invention is to maintain a virtually modified simple structure of the brake system which resulted from the main application, and to provide a solution with respect to preventing a premature undesirable activation of the controllable restrictor.

SUMMARY OF THE INVENTION

This object is achieved, according to the present invention, wherein invariable orifices are arranged in the main pressure line upstream of the inlet valve and downstream of the controllable restrictor.

Thus, favorably, the pressure increase speed in the control pressure port activating the restrictor valve is limited by way of the invariable orifice connected upstream of the inlet valve in the phase of pressure increase which is caused by operation of the master cylinder. Another invariable orifice, which is connected downstream of the controllable restrictor, supports the inactive condition of the controllable restrictor by a correspondingly raised pressure increase speed in another control pressure port of the restrictor valve, so that the controllable restrictor is ineffective in the slip-free normal braking mode.

DETAILED DESCRIPTION OF THE PREFERRED EMBODIMENTS

Figure 1:
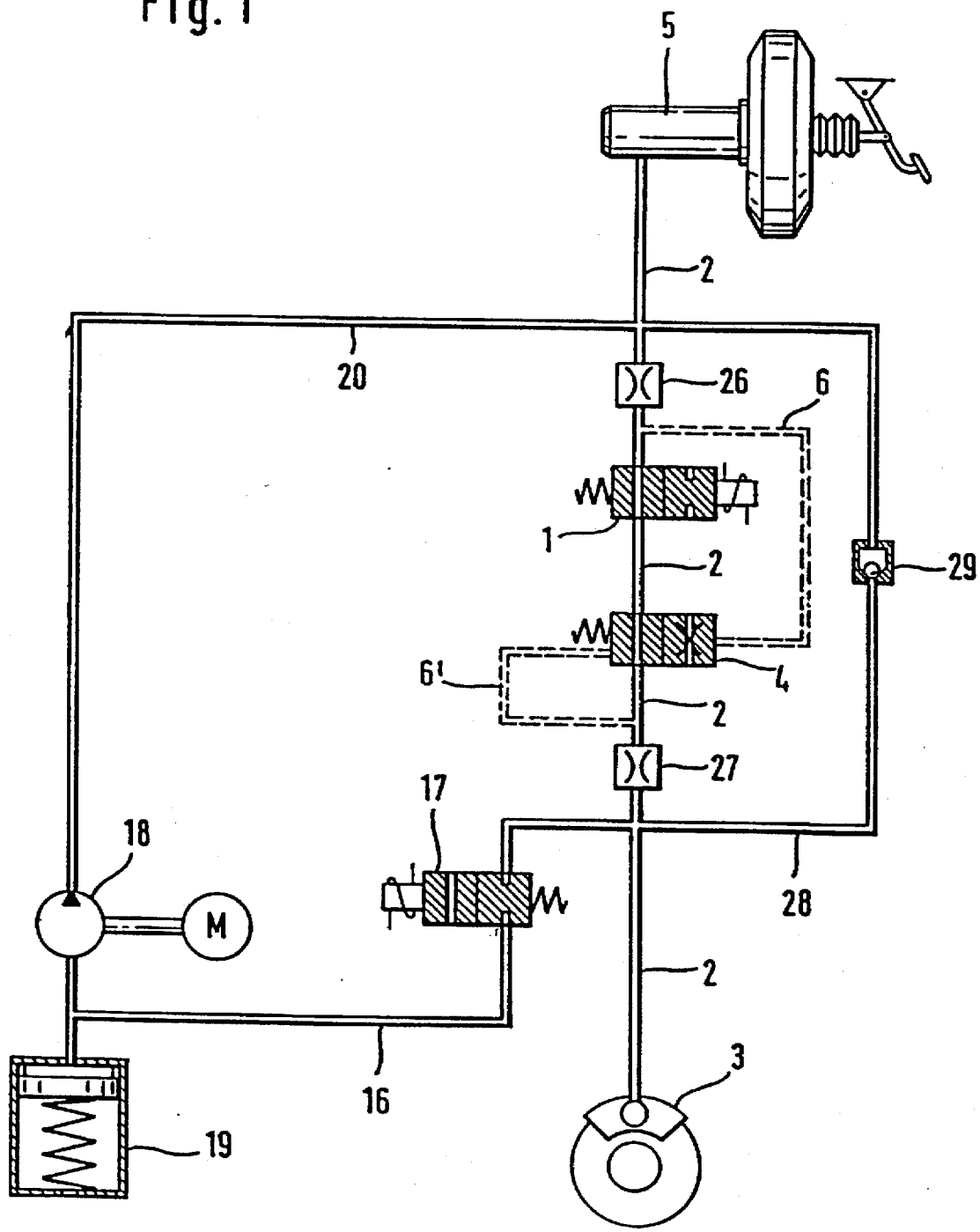
FIG. 1 is a hydraulic circuit of the brake system according to the present invention.

FIG. 1 is a schematic view of the hydraulic circuit for the brake system of the present invention. A braking pressure generator 5 is connected to a wheel brake 3 by way of a main pressure line 2. An inlet valve 1, which is electromagnetically open in the basic condition, and a restrictor 4, which is connected downstream of the inlet valve 1 and is inoperative in the basic condition, are comprised in the main pressure line 2. The controllable restrictor 4 is represented as a two-way/two-position directional control valve. A first control pressure port 6 is acted upon by the pressure of the braking pressure generator 5 and the pump pressure. A second, counteracting control pressure port 6' of the two-way/two-position directional control valve is acted upon by the pressure in the wheel brake 3. A compression spring 7, shown symbolically on the 2/2-way valve, ensures that the pressure fluid flow to the wheel brake 3 is initially unthrottled. In addition, a return line 16 is connected to the wheel brake 3 and is connected to the suction side of an auxiliary-pressure pump 18 by way of an electromagnetic outlet valve 17 which is closed in its basic condition. Further, the return line 16 has a low-pressure accumulator 19 for the intermediate storage of excessive pressure fluid volume. The pressure side of the auxiliary-pressure pump 18 is connected to the braking pressure generator 5 by way of an auxiliary-pressure line 20 and, in turn, to the main pressure line 2. An invariable orifice 26 is arranged between the connection of the auxiliary pressure line 20 and the inlet valve 1 to the main pressure line 2. Another invariable orifice 27 is positioned between the controllable restrictor 4 and the connection of the outlet valve 17 to the main pressure line 2 upstream of the wheel brake 3. The invariable orifice 26 connected upstream of the control pressure port 6 will always maintain the desired pressure increase gradient in the hydraulic system connected downstream of the invariable orifice, so that pressure peaks of an emergency braking will not cause undesirable operation of the restrictor 4 in the normal braking mode.

The restrictor valve configuration according to the present invention permits reducing the valve operating noises in the inlet valve 1 during slip control and, thus, during operation of the pump 18 as soon as, in the closed condition of the inlet valve, pressure in front of the inlet valve 1, which rises in a calibrated manner due to the invariable orifice 26, causes an increased difference in pressure, compared to the wheel braking pressure, which controls the activation of the restrictor 4 accordingly. The invariable orifice 27, which is connected downstream of the controllable restrictor 4, is interposed between the further control pressure port 6' and the connection of the return line 16 to the main pressure line 2, so that a predetermined pressure increase gradient is also achieved at the further control pressure port 6' during brake operation and determines the operating point of the restrictor 4. The rapid pressure reduction in the wheel brake 3 is not impaired by the effect of the invariable orifice because the wheel braking pressure is not impeded to escape either through a non-return valve 29 or, during slip control, through the open outlet valve 17.

Figure 2:
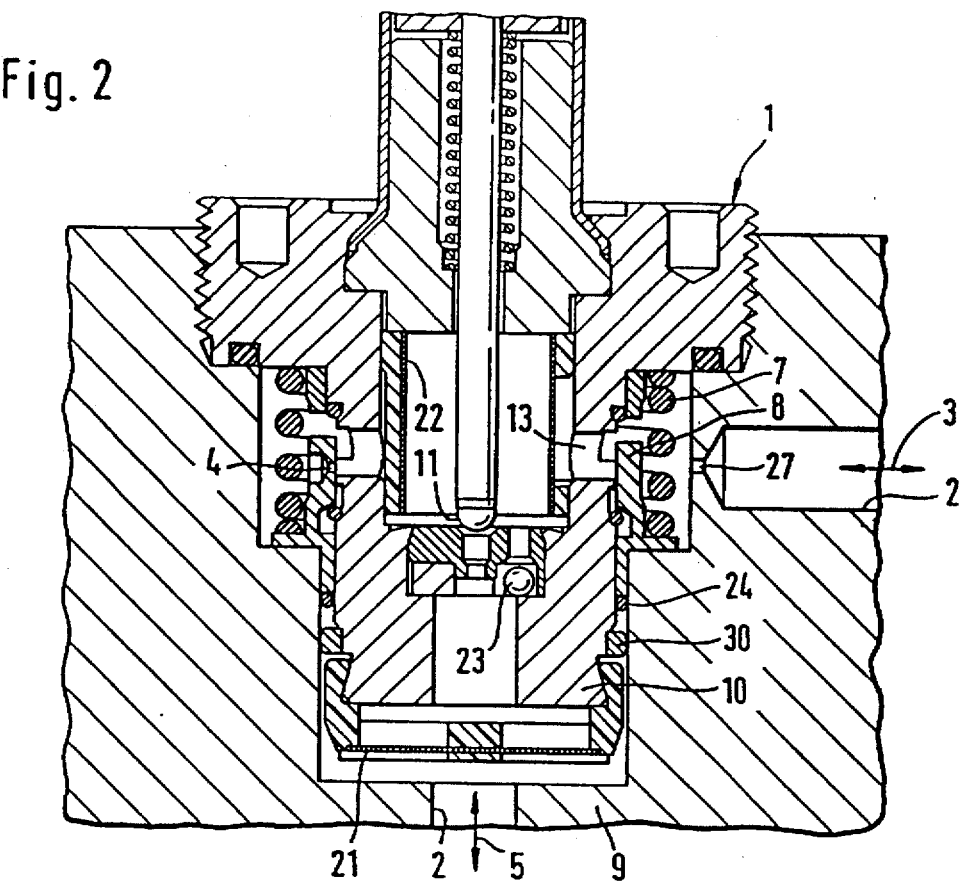
FIG. 2 is a partial cross-sectional view of an inlet valve of the brake system according to the present invention.

FIG. 2 shows a constructive embodiment of the arrangement of the invariable orifice 27 in a valve-accommodating member 9 and the design of the inlet valve 1. The inlet valve 1 has a valve carrier 10 including valve closure member 11 and the ducting of the main pressure line 2. Favorably, the valve carrier 10 is integrated in the valve-accommodating member 9 in a cartridge-type construction (screw-in cartridge). Pressure fluid in the main pressure line 2 propagates from the braking pressure generator 5 (symbolically shown) through the invariable orifice 26 (which is not explicitly shown in the valve-accommodating member) and through a plate-type filter 21, the open valve closure member, an annular filter element 22 inserted in the valve carrier 10 to a transverse bore 13 which is partially overlapping with the annular piston 8 in the present Figure. Due to its restrictor 4 arranged at the frontal end, the annular piston 8 performs the restrictor function and, accordingly, varies the stroke of the annular piston 8 and, thus, the flow cross-section between the transverse bore 13 and the end surface of the annular piston as a function of the differential pressure. The annular piston 8 is radially guided on the extension of the valve carrier 10 and, by the action of a compression spring 7, is supported on a bead acting as a stop between the stepped bore of the valve-accommodating member 9 and the extension. The plate-type filter 21 is attached by way of a retaining bowl staked on the extension. The compression spring 7 is compressed as a helical spring between the enlarged end surface portion of the valve carrier 10 and the adjacent end surface of the annular piston 8 in a manner which optimizes mounting space requirements. It should be mentioned that parts of the valve carrier 10, such as the extension or the valve seat accommodating the valve closure member 11, can include the invariable orifice 26.

With increasing hydraulic differential pressure on either side of the annular piston end surfaces and, thus, within the hydraulic line 2 in front of and behind the inlet valve 1, the annular piston 8 is displaced upwardly in opposition to the compression spring 7. Thereby, the annular piston will overlap the transverse bore 13 and reduce the flow cross-section to the size of the restrictor bore. To pressurize the small annular end surface on the annular piston 8 which is remote from the compression spring 7, a corresponding space is provided between the peripheral surface oft he plate-type filter 21 and the peripheral surface of a guide ring 30. The space serves to operate an O-ring 24 and the bottom part of the annular piston 8 hydraulically. When dimensioned accordingly, the space can also perform the function of the invariable orifice 26.

Also, the plate-type filter 21, as a plastic part, can be placed onto the periphery of the valve carrier 10. To improve the valve assembly, the small-clearance guide ring 30 and the O-ring 24 are placed on top of this arrangement so that the pressure-relief function is performed by way of a spherical non-return valve 23 which is arranged separately in the valve carrier 10. Thus, the O-ring 24 is exclusively intended to seal the annular piston 8. It is also possible to replace the spherical non-return valve 23 and to use an annular sleeve at the location of the O-ring 24.

As an example, a screw-type thread is used to attach the valve. Further types of attachment by calking or form-lock connections by a circlip are possible.

Figure 3:
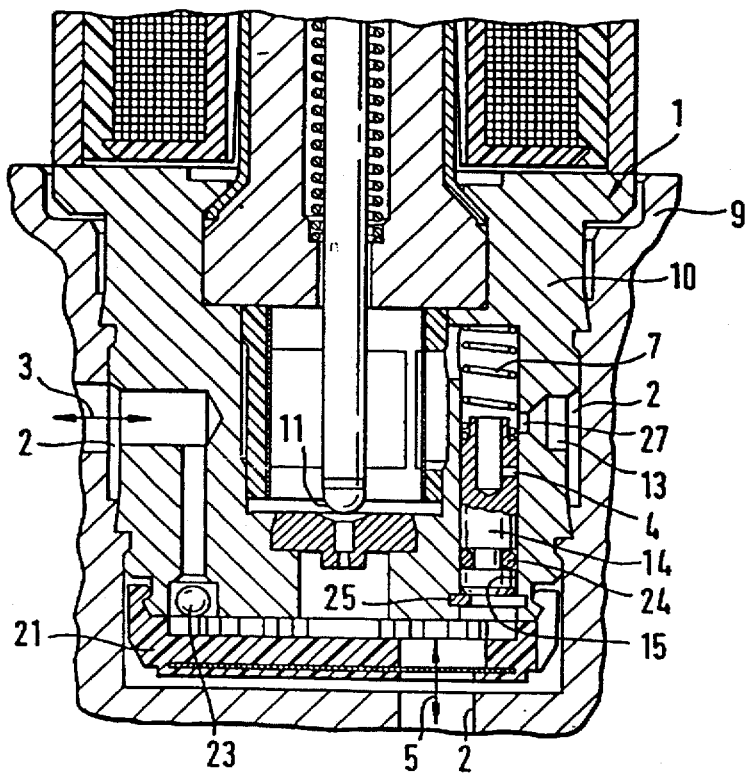
FIG. 3 is another partial view of an alternative embodiment of the inlet valve.

In contrast to the preceding embodiment of FIG. 2, FIG. 3 shows another alternative construction of inlet valve 1 to achieve the controllable restrictor function in coaction with the preceding invariable orifice arrangement by way of a control piston 14, which is structurally arranged in parallel to the valve closure member 11. Control piston 14 is guided radially in the valve carrier 10, sealed at the piston stem by O-ring 24, and it is supported with its end surface on a stop disc 25 snapped into the valve carrier 10. The opposite end surface of the control piston 14 is acted upon by a compression spring 7 as in the preceding embodiments. The aperture of the control piston 14 has a blind-end bore and, vertically to this bore, a restrictor 4 terminating in the bore. Corresponding to its shape, the restrictor has a restricting flow cross-section within the transverse bore 13, associated with, the main pressure line 2, so that the control piston 14 will shut off the transverse bore 13, except for the restricting cross-section, with an increasing pressure difference between the braking pressure generator 5 and the wheel brake 3. The transverse bore 13 of the valve carrier accommodates the invariable orifice 27. A feature of the described embodiment is the low-cost manufacture of the control piston 14 and the associated accommodating bore 15. The valve carrier 10 is retained in the valve-accommodating member 9 by self-calking in the embodiment shown. However, attachment of the valve is also possible by using other variants of force-locking and/or form-locking connecting methods, without the need for detailed explanations.

Similar to the invariable orifice 27 on the wheel brake side, the further invariable orifice 26 provided at the connection of the auxiliary pressure line 20 to the main pressure line 2 is favorably arranged in the valve carrier 10 and, thus, below the control piston 14. If ducting allows it, the invariable orifice 26 can also be arranged in the valve-accommodating member 9.

The embodiments referred to hereinabove permit a particularly compact integration of controllable restrictors and invariable orifices in the valve carrier 10 or the valve-accommodating member 9, without requiring intricate modifications to the valve construction. In contrast to FIG. 2, the non-return valve 23 is arranged in the valve carrier 10 and is connected to the main pressure line 2 (annular chamber) connected to the wheel brake 3 by way of a channel in the valve carrier 10.

Of course, the suggested embodiments with respect to the inlet valve can be used irrespective of the arrangement of invariable orifices 26, 27 in the hydraulic circuit, which was described in FIG. 1. Therefore, the inlet valve constructions can be considered as favorable details regardless of the approach to the present invention.

We claim:

1. A hydraulic brake system with slip control, of the type including a braking pressure generator which is hydraulically connected to at least one wheel brake by way of a main pressure line, a return line connected to the wheel brake and to a pressure-fluid collecting means, an auxiliary-pressure pump having an auxiliary-pressure line and being hydraulically connected to the braking pressure generator, and inlet and outlet valves inserted into the main pressure line and the return line and either closing or keeping open the pressure fluid passage in the main pressure line and in the return line, a controllable restrictor arranged in the main pressure line between the inlet valve and the wheel brake, permitting an unhindered hydraulic fluid flow in the main pressure line to the wheel brake in a first operating position and limiting the pressure fluid flow to the wheel brake in a second operating position, comprising:

a first invariable orifice arranged in the main pressure line upstream of the inlet valve and a second invariable orifice arranged downstream of the controllable restrictor.

2. A hydraulic brake system as claimed in claim 1 wherein the first invariable orifice preceding the inlet valve is arranged between the connection of the auxiliary-pressure line to the main pressure line and a first control pressure port associated with the controllable restrictor, wherein the invariable orifice, serially arranged downstream of the controllable restrictor, is inserted between the connection of the return line to the main pressure line and a second control pressure port associated with the restrictor.

3. A hydraulic brake system as claimed in claim 2 wherein said first control pressure port is positioned between the first invariable orifice and the inlet valve, wherein the second control pressure port, which provides the unimpeded open basic condition of the controllable restrictor, is positioned between the second invariable orifice and the controllable restrictor.

4. A hydraulic brake system as claimed in claim 1, further including a by-pass line, which includes a non-return valve that opens in the direction of the braking pressure generator, connected to the main pressure line upstream of the first invariable orifice and downstream of the second invariable orifice.

5. A hydraulic brake system as claimed in claim 1, wherein the invariable orifices are an integral part of a valve-accommodating member which accommodates the inlet valve and the controllable restrictor.

* * * * *